No. 861,813. PATENTED JULY 30, 1907.
F. B. COOK.
JUNCTION BOX.
APPLICATION FILED MAR. 2, 1907.
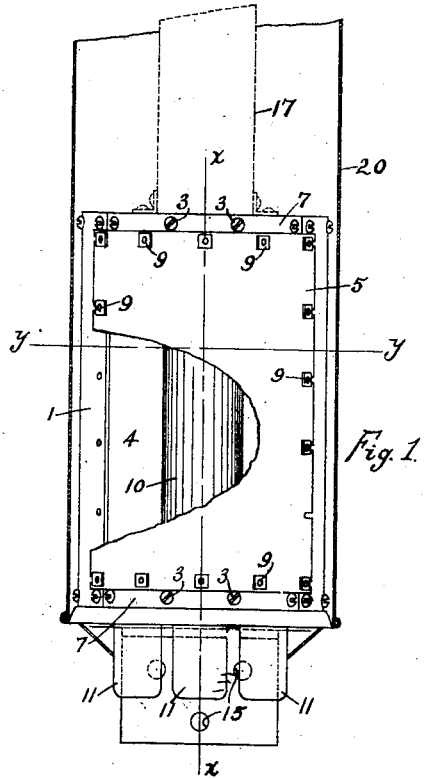
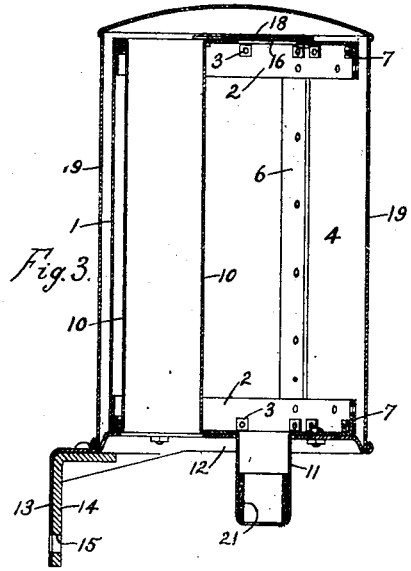
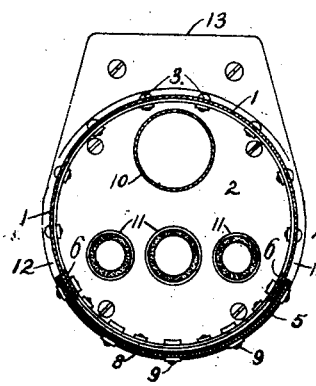
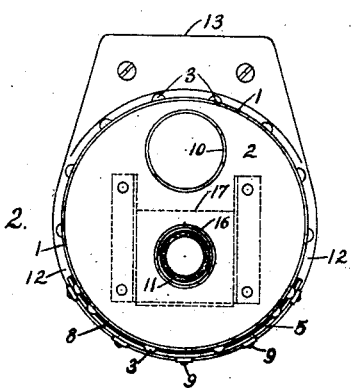
WITNESSES: Frederick R. Parker. J. W. Pardee.
INVENTOR: Frank B. Cook.

UNITED STATES PATENT OFFICE.

FRANK B. COOK, OF CHICAGO, ILLINOIS.

JUNCTION-BOX.

No. 861,813.    Specification of Letters Patent.    Patented July 30, 1907.

Application filed March 2, 1907. Serial No. 360,185.

*To all whom it may concern:*

Be it known that I, FRANK B. COOK, a citizen of the United States of America, residing at Chicago, in the county of Cook and State of Illinois, have invented a new and useful Junction-Box, of which the following is a specification, reference being had to the accompanying drawings, illustrating same.

This invention is an improvement on my co-pending application for Letters Patent on cable terminal and junction box, Serial No. 325,325, filed July 9, 1906.

My invention relates to junction boxes for electrical conductors, such boxes being employed for inclosing and protecting the ends of electrical conductors which are to be connected together therein.

The principal objects of my invention are to provide an improved junction box of the character stated, constructed entirely of sheet metal; to provide improved means for carrying aerial conductors or bridle wires from a terminal mounted on the junction box, through the latter; and to provide general improvements in the construction of such a junction box.

Other objects will be apparent from the following specification.

By reference to the accompanying drawings illustrating my invention, Figure 1 is a front elevation of the junction box of the invention, with a portion of the front cover removed, showing a portion of a cable terminal mounted on top of the box, in dotted lines, and a cylindrical sheet-metal cover for the whole in longitudinal cross-section; Fig. 2 is a plan view of Fig. 1, with the cylindrical sheet-metal cover removed; Fig. 3 is a longitudinal cross-sectional view of the junction box of the invention, with a cylindrical sheet-metal cover therefor, taken on line $x$ $x$ of Fig. 1, with the front cover removed; and Fig. 4 is a transverse cross-sectional view of the junction box, with the cylindrical sheet-metal cover removed, taken on line $y$ $y$ of Fig. 1.

Like characters refer to like parts in the several figures.

The inclosure of the junction box is constructed of a cylindrically-shaped piece of sheet metal 1 having flat end portions 2 2 set therein and bolted thereto by bolts 3 3, and having an opening 4 in the front side thereof which is covered by a suitable curved sheet-metal cover 5. The edge portions of the sheet-metal portion 1, which extend along the sides of the opening 4, are preferably folded back as at 6 to stiffen them. At the ends of the front opening 4 are provided strips of sheet metal 7 7 bolted to the end caps 2 2 to make the end portions of the exterior cylindrical surface of the junction box of a continuous smooth curvature. Between the lid 5 and the portion 1 is placed a rubber gasket 8 to make the joint between the lid 5 and the box 1 air and moisture tight. The lid 5 is bolted to the box 1 by bolts 9 9, the holes along the sides of lid 5 which accommodate the bolts 9 9 being cut out to the edge of lid 5 so that the latter may be readily put in place over the radially-extending bolts 9 9. A sheet-metal tube 10 extends longitudinally through the box 1, it being suitably held in place to the end portions 2 2 by having its ends slightly flared out.

In the bottom of the junction box are provided suitable nozzles 11 11, preferably of the self-soldering type which are readily understood, to accommodate the cables leading to the junction box. The nozzles 11 11 are tightly secured through openings in the end surface of the lower end portion 2 by having their inner ends flared out.

The junction box as a whole is suitably mounted on a circular sheet-metal base 12, a portion of the base 12 being formed as at 13 to form a mounting bracket for mounting the junction box to a suitable support. Against the bracket 13 is secured a heavy angle-iron 14 to strengthen the bracket 13. The mounting bracket 13 14 is provided with suitable holes 15 15 for mounting the junction box. In the end surface of the upper end portion 2 is provided a hole 16 adapted to accommodate conductors leading from the junction box to a suitable cable terminal which is preferably mounted on top of the junction box as shown in dotted lines 17 in Figs. 1 and 2. If it is not desired to mount a cable terminal on the junction box, the hole 16 may be closed by a suitable plate 18, with a rubber gasket placed between the plate 18 and the end surface of portion 2.

When the junction box is used by itself as shown in Fig. 3, a cylindrical sheet-metal cover 19 is preferably placed over the junction box as shown, to protect it from the weather. When a cable terminal is used in connection with the junction box, a longer cylindrical sheet-metal cover 20 is placed over the terminal and junction box as shown in Fig. 1, so as to inclose the whole and protect the terminal and junction box from the weather. The sheet-metal covers 19 and 20 may be made of sheet copper, or of galvanized sheet steel.

In making the junction box, the portions 1, 2, 2, 7, 7, 10, 11, 11, 12, 13 and 14, are all assembled as shown in the drawings and then galvanized as a whole, the galvanizing completely sealing all of the joints in the latter and thereby making the junction box absolutely air and moisture tight. The cables leading to the junction box are suitably cleaned and inserted through the nozzles 11 11. Then the nozzles 11 11 are heated sufficiently to soften the solder 21 therein and cause same to unite with the lead sheaths of the cables and thereby make tight metallic joints around the cables. In addition to this, the lower cup-shaped end portion 2 is provided, so that it may be filled with an insulating compound to seal the cables in the base portion of the junction box. The number and size of the self-soldering nozzles 11 11 may be varied to satisfy the requirements. Some of the conductors of one cable may be spliced to corresponding conductors of other cables, within the junction box, when it is desired to branch or splice the cables, and some of the conductors may be carried through the opening 16 in the top of the junction box to a cable terminal mounted thereon. When the cable terminal is used, the bridle wires leading to aerial line wires are extended from the cable terminal down through the tube 10 and base plate 12 and thence to the line wires of the system. When the cable terminal is not used in connection with the junction box, the cable conductors are simply spliced together within the box, the tube 10 being not used.

It will be readily seen that the junction box may be suitably installed by itself and then at any time thereafter a cable terminal mounted on the junction box and some of the cable conductors extended through the opening 16 to the terminal. This makes a very pliable arrangement for cable distribution. It will also be seen that the junction box of this invention is very light, compact, and accessible.

I do not wish to limit this invention to all of the particular details of construction as herein shown, as many modifications may be made therein without departing from the scope of the invention.

What I claim as new and desire to secure by Letters Patent, is:

1. A junction box of the character described, comprising a cylindrical sheet-metal box portion, a removable lid on one side thereof, a tube extending through the box portion and having its ends opening outside of the box portion and means for mounting the box portion to a suitable support.

2. A junction box of the character described, comprising two cylindrical sheet-metal tubes, one extending through the other, end portions connecting the end portions of the inner tube to the corresponding end portions of the outer tube, a removable lid for the outer tube, and means for accommodating a cable leading to the inclosure between the tubes.

3. A junction box of the character described, comprising two tubes, one inserted longitudinally through the other, suitable end portions joining the corresponding end portions of the tubes and inclosing the space between the tubes, and a removable lid for the outer tube.

4. A junction box of the character described, comprising a curved piece of sheet metal, cup-shaped end portions rigidly secured thereto, a second curved piece of sheet metal removably secured to the first and to the said end portions to form a cylindrical inclosure between the said end portions, a suitable mounting base for the whole, and means for accommodating cables leading through the base portion into the inclosure.

5. A junction box of the character described, comprising a curved piece of sheet metal, cup-shaped end portions secured thereto, a second curved piece of sheet metal removably secured to the first and to the said end portions to form a cylindrical inclosure between the said end portions, a tube extending longitudinally through the said cylindrical inclosure, a circular mounting plate for the whole, and means for accommodating cables leading through the base portion into the inclosure.

6. A junction box of the character described, comprising a curved piece of sheet metal, cup-shaped end portions secured thereto, a second curved piece of sheet metal removably secured to the first and to the said end portions to form a cylindrical inclosure between the said end portions, a tube extending longitudinally through the said cylindrical inclosure, a circular mounting plate for the whole, means for accommodating cables leading through the base portion into the inclosure, and a cylindrical sheet-metal cover placed over the junction box as a whole.

7. A junction box of the character described, comprising a cylindrically-shaped box portion made of sheet metal, a circular base of sheet metal upon which the box portion is mounted, a tube extending longitudinally through the said box portion for carrying electrical conductors, an opening through the base concentric with the tube, an opening through the top of the box portion concentric with the tube, and suitable nozzles extending through the base and opening into the inclosure of the box portion.

8. A junction box of the character described, comprising a cylindrical box portion made of sheet metal, a circular sheet-metal base plate upon which the box portion is mounted, a portion of the sheet-metal base plate being formed as a bracket to be bolted to a suitable support, suitable nozzles extending through the base plate and opening into the inclosure of the box portion, and an angle-iron placed within the said bracket for stiffening or strengthening same.

9. A junction box of the character described, comprising a cylindrical box portion with flat ends, constructed of sheet metal, a cable terminal mounted on the junction box, an opening from the junction box into the cable terminal, a suitable base plate upon which the junction box is mounted, a tube extending longitudinally through the inclosure of the junction box for accommodating aerial conductors leading from the cable terminal to the lines, and suitable means for accommodating cables leading through the lower end of the junction box.

10. A junction box of the character described, comprising a cylindrical box portion with flat ends, constructed of sheet metal, a tube extending through the box portion and opening at either end exterior of the box portion, a removable side portion of the box portion, and a suitable gasket between the removable side portion and the box portion to make a tight joint therebetween.

11. A junction box of the character described, comprising a cylindrical side portion having a portion thereof removed, flat cup-shaped end portions secured to the said side portion to form an inclosure, a tube extending through the said end portions and through the said inclosure, a suitable base upon which the whole is mounted, suitable nozzles extending through the base and one said end portion, all of the parts specified being made of sheet metal and being galvanized after being assembled, substantially as described.

As inventor of the foregoing, I hereunto subscribe my name in the presence of two subscribing witnesses, this 27th day of February, 1907.

FRANK B. COOK.

Witnesses:
FREDERICK R. PARKER,
F. W. PARDEE.